March 24, 1959 — L. R. STARLING ET AL — 2,878,668

ANCHOR BOLT

Filed Aug. 6, 1956

INVENTORS
L. R. STARLING
J. A. TIFFANY
BY: Fetherstonhaugh & Co.
ATTORNEYS

United States Patent Office 2,878,668
Patented Mar. 24, 1959

2,878,668

ANCHOR BOLT

Leslie Robert Starling and John Albert Tiffany, Timmins, Ontario, Canada

Application August 6, 1956, Serial No. 602,240

3 Claims. (Cl. 72—105)

This invention relates to a rock anchor for anchoring cables, roof bolts in mines, rock bolts and the like.

It is an object of this invention to provide a simple and easy to use anchoring arrangement whereby bolts, eyelets and the like can be anchored into rock or the like.

Generally speaking, our anchor is adapted to grip within a hole bored in the rock or the like and it comprises a rod having a sloping surface thereon which co-operates with a wedge, the first wedging surface of which co-operates with the sloping surface of the rod, and the second surface of which engages with the side of the hole in use. The wedging action due to the sliding action between the sloping surface of the rod and the first wedging surface of the wedge forces the rod and the second wedging surface of the wedge into a tight engagement with the side of the hole that is only made tighter by any attempt to withdraw the rod from the hole. The wedge is preferably formed with serrations on the side thereof that grip with the side of the hole in the rock.

The invention will be clearly understood after reference to the following detailed specification read in conjunction with the drawings.

Figures 4, 5:
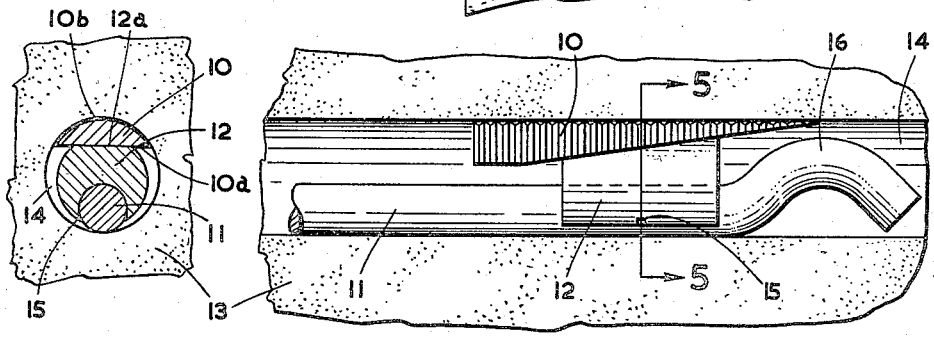
Figure 4 is an enlarged view illustrating the anchoring device in position.

And Figure 5 is a sectional view along the line 5—5 of Figure 4.

Referring to the drawings, the anchor therein illustrated, comprises a steel wedge 10, a steel rod 11, and a steel block 12, carried by the rod 11.

Figure 3:
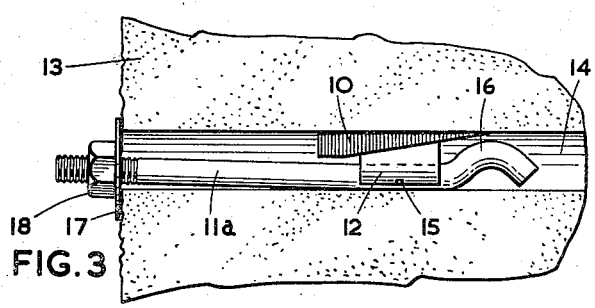
Figure 3 shows an alternative form of the rock anchor anchored in a hole in the rock.

The embodiment of the invention in Figure 3 is somewhat different in respect of the rod and in Figure 3, we will refer to the rod by the numeral 11a, to signify the difference. In each embodiment however, the anchoring action is the same in principle.

The anchor is adapted to grip in rock or other hard medium generally indicated by the numeral 13, into which a hole 14 has been drilled.

The block 12 is clipped or pinched onto the rod 11 by deforming it to achieve a tight engagement between the two as at 15 adjacent one end of the rod and just behind a kink formed therein as at 16.

It will be noted that the block 12 overlies the rod 11 and the kink 16 is designed to prevent the block 12 from sliding off the free end thereof in use. The kink is substantially in a U and in use as seen in the drawings nearly touches the side wall of the hole 14.

The wedge 10 has two wedging surfaces, the first one 10a is flat and is adapted to engage with a flat sloping surface 12a of the block 12 that is carried by the rod 11. The second wedging surface of the wedge 10 is rounded to conform to the contour of the hole 14 and is indicated by the numeral 10b. The rounded surface 10b is formed with serrations extending transversely of the wedge which are in use as will be explained later adapted to grip the side walls of the hole 14 formed in the rock 13.

We will first describe the manner of using the anchor illustrated in Figure 3 of the drawings. The rod 11, with the steel block 12 pinched thereon adjacent the free end thereof as illustrated, is inserted into the hole 14 with the wedge 10, sitting on the block and with the toe of the wedge part way up on the flat sloping surface 12a indicated in Figure 1. A setting rod (not shown) having a length at least the length of the rod 11a is placed along or on top of the rod with its end just touching the heel or thick end of the wedge. Together the rod and setting rod are pushed into the hole carrying with them the wedge, until all three are in to a desired depth. The setting rod is then tapped farther into the hole to drive the wedge solidly into place in the hole alongside the block 12 whereby the side 10b thereof engages with the side of the hole. The setting rod is then withdrawn from the hole and a steel plate washer 17 is put over the threaded end of the bolt and fastened at the opening of the hole by means of a nut 18. As the nut is tightened it pulls on the rod whereby the block, which is fastened to the rod, is moved towards the heel of the wedge. The co-operating surfaces 12a and 10a of the block and the wedge respectively slide to force the wedge to more tightly contact with the side of the hole. The wedge does not slip out of the hole because the serrations cut on the outside of it, grip firmly into the wall of the hole.

It will be noted in Figure 5 that the surface 10b of the wedge abuts one side of the hole 14 and that a line contact is made between the rod 11 and the opposite side of the hole. It will also be noted that the wedging surface 10a of wedge 10 has a substantially greater width than the flat surface of the block 12 with which it co-operates, whereby the contact surface 10b of the wedge is large. It will be further noted that the block 12 is smaller in cross-section than the cross-section of the hole 14 and presents no contact surface therewith. It is thus apparent that a plurality of wedges of various cross-sectional dimensions may be used interchangeably with the same rod and block in conformation with holes of varying corresponding cross-sectional dimensions.

Figure 1:
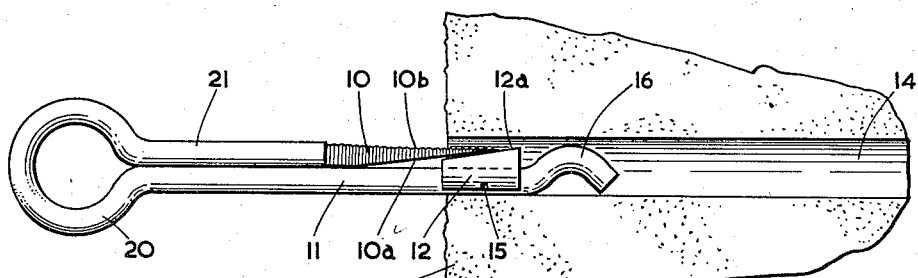
Figure 1 is a view of an anchor according to the present invention, about to be inserted into a hole formed in rock.
Figure 2:
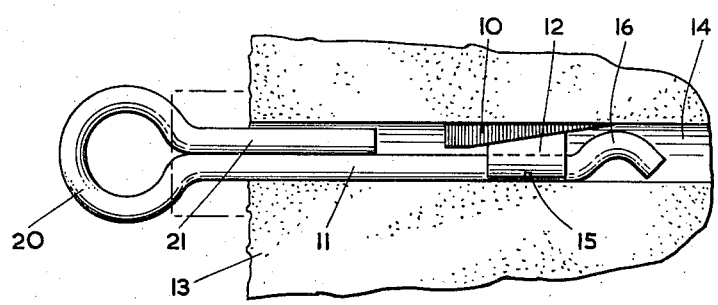
Figure 2 is a view similar to Figure 1 but showing the anchor firmly anchored into the rock.

In many cases the rod is not threaded as the rod 11a of Figure 3 and a loop rod as illustrated in Figures 1 and 2 is employed. In such a case, the anchor can be formed such that the setting rod previously referred to is not required in order to put the wedge in place because in this case the loop 20 is made such that the end of the rod is doubled back as at 21 on the shank thereof a sufficient distance that the wedge 10 sits as illustrated in Figure 1 when the heel thereof abuts the end 21 of the rod. In such a case the end 21 of the rod serves as the setting rod.

With the unit arranged as in Figure 1, it is inserted into the hole 14. Anchoring is achieved by a fast pushing motion into the hole and a sudden jerk back as it reaches its desired depth. With the sudden jerk the surfaces 12a and 10a of the block and wedge respectively slide with respect to each other to cause the wedge 10 to move laterally of the hole and grip the side of the hole 14, the serrations thereon biting into the rock. It will be apparent that further outward force on the rod will only tend to tighten the wedging action that anchors the unit in the hole.

To insure that the rod in the case of the loop construction will not come loose, a wooden wedge can be driven between the face around the opening of the hole and the loop of the rod.

We have made and used the rock anchor described with a rod 9/16 of an inch in diameter made of steel. The block we employ is approximately two inches long and about 3/16 to 1/4 of an inch smaller in diameter than the size of the hole 14 that it is to fit into. The side 12a has approximately a 9° taper.

We have used the wedge of the above specification successfully in a 1 3/8 inch hole. In such a case the wedge is 4 1/4 inches long and had a 7° to 10° taper.

Of course the above dimensions can be varied to a considerable extent within the scope of the invention. In so far as the wedge is concerned while a 7° to 10° taper is preferred it can be varied. If, however, the taper is too steep, the wedge of the anchor will tend to grab too soon and release too fast. If the taper is too small, the wedge would require to be too long to give the tightening effect desired. These however are matters of degree and not of invention.

Embodiments of the invention then, other than the ones shown will be apparent to those skilled in the art and it is not our intention that the invention should be limited to the specific embodiments shown and not by any means to the specific dimensions given, both being given by way of illustration of the invention only.

What we claim is:

1. An anchor for insertion into a hole comprising a rod of substantially lesser cross section than said hole, securing means at one end of said rod, a block at the opposite end of said rod and carried upon said rod, an inclined surface upon said block, said inclined surface sloping toward a point on said rod intermediate said securing means and said block, a wedge lying on said inclined surface of said block, a first wedging surface upon said wedge, said first wedging surface abutting said inclined surface of said block, a second wedging surface being rounded in cross section to conform to the contour of said hole and being roughened for engagement therewith, said second wedging surface having a substantially greater contact surface with reference to the contour of said hole than said rod, said block being smaller in cross section than the cross section of said hole and presenting no contact surface therewith, whereby a plurality of said wedges of varying cross-sectional dimensions may be used interchangeably with the same rod and block to fit in holes of varying corresponding cross-sectional dimensions.

2. The combination of claim 1 wherein said block is in sliding relation to said rod, said rod having a kink formed thereon at the end opposite said securing means and beyond said block, said kink being adapted to prevent said block from sliding longitudinally off of said rod.

3. The combination of claim 1 wherein said securing means comprises a loop formed by bending the end of said rod opposite said block upon itself, the free end of the portion bent upon itself terminating adjacent said block whereby the end portion thereof locates said wedge on said block with the first wedging surface of said wedge lying on the inclined surface of said block.

References Cited in the file of this patent

UNITED STATES PATENTS

| | | |
|---|---|---|
| 798,440 | McNulty | Aug. 29, 1905 |
| 922,980 | Vernon | May 25, 1909 |
| 1,047,267 | Merrill | Dec. 17, 1912 |
| 1,110,797 | Knox | Sept. 15, 1914 |
| 1,396,398 | Bowman | Nov. 8, 1921 |
| 1,964,427 | Chandler | June 26, 1934 |

FOREIGN PATENTS

| | | |
|---|---|---|
| 492,646 | Canada | May 5, 1953 |